Patented Mar. 8, 1932

1,848,665

UNITED STATES PATENT OFFICE

WALTER SCHOELLER, HANS JORDAN, AND WALTER LINDE, OF BERLIN, GERMANY, ASSIGNORS TO THE FIRM SCHERING-KAHLBAUM A. G., OF BERLIN, GERMANY

PRODUCTION OF ALKYLATED PHENOLS

No Drawing. Application filed November 8, 1929, Serial No. 405,838, and in Germany November 29, 1928.

Our invention refers to the production of alkylated phenols, which form valuable starting products for the production of scents and disinfectants.

We have found that dihydroxydiphenylmethane derivatives, such as are for instance readily obtainable by causing condensation of aldehydes or ketones with phenols, can be converted with particular advantage into alkylated phenols, accompanied by a phenol, with the aid of hydrogenated compounds, of which different products of hydrogenation are known, the molecule being decomposed and hydrogen being taken up from the hydrogenated compound.

We have further found that of the hydrogenated compounds, which can be used to give off their hydrogen, cyclohexanol and its homologues, and further borneol and similar compounds prove particularly useful. These spenders of hydrogen will in the course of the reaction be converted into the corresponding ketones.

In order to expedite the reaction we have found it useful to operate in the presence of one of the well known hydrogenation catalysts.

Our process results in quantitative yields and, as compared with the direct hydrogenation, offers the advantage of allowing a very accurate dosage of hydrogen and very short duration of the reaction.

In some cases the ketones obtained as byproducts are recovered in a state of purity, which cannot be obtained by direct hydrogenation of the phenols.

*Example 1.*—1 molecule 4-4'-dihydroxydiphenylmethylmethane is stirred together with one molecule cyclohexanol and the mixture is heated during about one hour to 220–230° C. in an autoclave in the presence of about 1% of its total weight of a hydrogenation catalyst. During the reaction the pressure rises to about 15 atm. After cooling and separation of the catalyst fractional distillation results in the recovery of cyclohexanon, phenol, and p-ethylphenol.

*Example 2.*—1 molecule 4-4'-dihydroxydiphenyldimethylmethane is stirred with one molecule cyclohexanol and is then treated in the presence of about 1% of a hydrogenation catalyst as described with reference to Example 1. There are obtained cyclohexanon, phenol, and p-isopropylenephenol.

*Example 3.*—1 molecule 2-2'-dihydroxy-4-4'-dimethyldiphenyldimethylmethane is heated with one molecule cyclohexanol and about 1% of a hydrogenation catalyst during about thirty minutes in an autoclave to 220–230° C. There results cyclohexanon, m-cresol and thymol.

In a similar manner and with similar results methylcyclohexanol and mixtures of isomer methylcyclohexanols, such as are obtained in the hydrogenation of crude cresol, can be used as starting materials, and there are then obtained methylcyclohexanon or a mixture of isomer methylcyclohexanons besides m-cresol and thymol.

Various changes may be made in the details disclosed in the foregoing specification without departing from the invention or sacrificing the advantages thereof.

In the claims the term "cyclohexanol" is intended to cover alkylcyclohexanols including methylcyclohexanol and borneol.

We claim:—

1. The process of producing alkylated phenols accompanied by phenols and ketones, characterized thereby that a dihydroxydiphenylmethane compound is caused to react at 220–230° C. with a cyclohexanol.

2. The process of producing alkylated phenols accompanied by phenols and ketones, characterized thereby that a dihydroxydipheylmethane compound is caused to react at 220–230° C. in the presence of a hydrogenation catalyst with a cyclohexanol.

3. The process of producing thymol comprising heating 2-2'-dihydroxy-4-4'-dimethylphenyl-dimethylmethane at 220–230° C. in the presence of a hydrogenation catalyst with a cyclohexanol.

In testimony whereof we affix our signatures.

WALTER SCHOELLER.
HANS JORDAN.
WALTER LINDE.